(12) United States Patent
Szymański

(10) Patent No.: US 12,135,749 B2
(45) Date of Patent: Nov. 5, 2024

(54) CHANNEL BASED FLOW CONTROL OF DATA DURING EXECUTION OF DATABASE QUERIES

(71) Applicant: Oxla sp. z o.o., Warsaw (PL)

(72) Inventor: Adam Szymański, Warsaw (PL)

(73) Assignee: OXLA SP. Z O.O., Warsaw (PL)

(*) Notice: Subject to any disclaimer, the term of this patent is extended or adjusted under 35 U.S.C. 154(b) by 140 days.

(21) Appl. No.: 17/886,445

(22) Filed: Aug. 11, 2022

(65) Prior Publication Data
US 2024/0037151 A1 Feb. 1, 2024

(30) Foreign Application Priority Data
Jul. 28, 2022 (PL) .......................................... 441869

(51) Int. Cl.
G06F 16/00 (2019.01)
G06F 16/903 (2019.01)
G06F 16/30 (2019.01)

(52) U.S. Cl.
CPC .............................. *G06F 16/90335* (2019.01)

(58) Field of Classification Search
None
See application file for complete search history.

(56) References Cited

U.S. PATENT DOCUMENTS

| 5,638,535 | A* | 6/1997 | Rosenthal | G06F 5/06 710/1 |
| 9,684,671 | B1* | 6/2017 | Dorin | G06F 16/182 |
| 11,481,398 | B1* | 10/2022 | Behm | G06F 16/244 |
| 2007/0162425 | A1* | 7/2007 | Betawadkar-Norwood | G06F 16/24535 |
| 2007/0250470 | A1* | 10/2007 | Duffy | G06F 16/24532 |
| 2009/0083238 | A1* | 3/2009 | Chaudhuri | G06F 16/24561 |
| 2009/0225082 | A1* | 9/2009 | Hargrove | G06T 11/206 345/440 |
| 2010/0332472 | A1* | 12/2010 | Graefe | G06F 16/24542 707/769 |
| 2013/0238656 | A1* | 9/2013 | Chen | G06F 16/27 707/E17.014 |
| 2014/0214800 | A1* | 7/2014 | Liang | G06F 16/24532 707/718 |
| 2015/0324135 | A1* | 11/2015 | Chan | G06F 3/0689 711/146 |
| 2016/0314176 | A1* | 10/2016 | Dhayapule | H04L 47/125 |
| 2016/0328488 | A1* | 11/2016 | Lytle | G06F 16/252 |

(Continued)

*Primary Examiner* — Polina G Peach
(74) *Attorney, Agent, or Firm* — FENWICK & WEST LLP

(57) ABSTRACT

A database system generates an execution plan including multiple operators for processing a database query, for example, a join query or a group by query. The database system allocates a set of threads. Threads communicate with other threads via blocking channels. A blocking channel includes a buffer of a fixed capacity. The database system processes the database query by streaming data through operators of the execution plan. A thread sends data generated by an operator to another thread via the blocking channel if the buffer of the blocking channel has available capacity to store the data, or else the thread blocks until the buffer has capacity to store the data. Similarly, a thread receives data generated by an operator of another thread via the blocking channel if the buffer of the blocking channel has available data, or else the thread blocks until the buffer has data.

20 Claims, 9 Drawing Sheets

(56) References Cited

U.S. PATENT DOCUMENTS

| | | | | |
|---|---|---|---|---|
| 2016/0350394 | A1* | 12/2016 | Gaumnitz | G06F 16/2255 |
| 2018/0357331 | A1* | 12/2018 | Wen | G06F 9/4881 |
| 2021/0073226 | A1* | 3/2021 | Chavan | G06F 16/24537 |
| 2021/0224675 | A1* | 7/2021 | P. | G06N 3/006 |
| 2021/0374135 | A1* | 12/2021 | Cruanes | G06F 16/24542 |

* cited by examiner

CHANNEL BASED FLOW CONTROL OF DATA DURING EXECUTION OF DATABASE QUERIES

CROSS REFERENCE TO RELATED APPLICATION

This application claims the benefit of Polish Provisional Patent Application No. P.441869, filed Jul. 28, 2022, with the Polish Patent Office, which is incorporated by reference in its entirety.

FIELD OF INVENTION

This disclosure relates generally to execution of database queries and more specifically to using blocking channels for efficient execution of database queries.

BACKGROUND

Enterprises often use databases, for example, relational databases for processing data. Users execute applications that invoke database queries that process the data stored in the databases. The queries sent by the applications are received and processed by a database system. The amount of data stored and processed by a database system can be large. As a result, often multiple processors are used for processing database queries. Conventional system run database queries in stages, each stage representing one or more operations related to the processing of the database query. The processing of a database query may require that execution of a particular stage is started after a set of previous stages complete execution. The execution of such database queries is coordinated using a coordinator processor. Use of a coordinator processor to coordinate execution of database queries often results in delays due to synchronization between the coordinator processors and other processors. Furthermore, conventional query engines buffer large amount of data for a prolonged periods of time to ensure that the data is available to any subsequent stages of execution of the database query. As a result, large amount of memory is required for processing the queries.

SUMMARY

The above and other issues are addressed by a computer-implemented method, computer system, and computer readable storage medium for processing database queries. A database system receives a database query for processing data stored in one or more input tables. The database system generates an execution plan for executing the database query. The execution plan includes a plurality of operators. At least one of the operators receives data output by another operator or generates output provided as input to another operator. The database system allocates a set of threads for executing operators of the execution plan. Each thread processes one or more operators. The set of threads includes at least a first thread executing a first operator and a second thread executing a second operator. The first thread communicates with the second thread via a blocking channel that includes a buffer of a fixed capacity for storing data. The database system processes the database query by streaming data of through the operators of the execution plan. The first thread provides output of the first operator to the second operator of the second thread via the blocking channel. The database system processes the database query by repeatedly performing the following steps. The first thread sends data generated by the first operator to the second thread executing the second operator via the blocking channel if the buffer of the blocking channel has available capacity to store the data. The execution of the first thread is blocked if the buffer of the blocking channel is full. Furthermore, execution of the first thread is blocked until the buffer of the blocking channel has capacity to store the data generated by the first operator.

According to an embodiment, the database system processes the database query by performing the following steps. The second thread receives data stored in the buffer of the blocking channel for performing the second operator if there is data available in the buffer of the blocking channel. The execution of the second thread is blocked if the buffer of the blocking channel is empty. The execution of the second thread is blocked until the buffer of the blocking channel has data available for processing by the second operator.

According to an embodiment, the database system executes database queries that perform grouping. The database system receives a database query including a grouping clause for aggregating data stored in the input table. The database system generates an execution plan for executing the database query. The execution plan includes a plurality of operators and stores partial aggregation results in a data structure, for example, a hashmap. The execution plan includes instructions for a plurality of data distribution strategies for distributing the data structure over the cluster of servers. The database system allocates a set of threads for executing operators of the execution plan. The set of threads comprise at least a first thread and a second thread, wherein the first thread communicates with the second thread via a blocking channel comprising a buffer of fixed capacity for storing data. The database system processes the database query by streaming data through the operators of the execution plan. The processing of the database query comprises following steps. The database system determines a size of the data structure based on the data of the input table. The database system selects a data distribution strategy from the plurality of data distribution strategies based on the size of the data structure. The first thread communicates data via the blocking channel to the second thread to implement the selected data distribution strategy.

According to an embodiment, the data distribution strategy selected from the plurality of data distribution strategies stores the data structure in each server of the cluster of servers if the size of the data structure is below a threshold value.

According to another embodiment, the data distribution strategy selected from the plurality of data distribution strategies partitions the data structure across a plurality of servers of the cluster of servers if the size of the data structure exceeds a threshold value.

According to an embodiment, the database system executes a database query for performing join of data stored in a plurality of input tables. The database system receives a database query specifying a join of a scan table with a hash table. The database system generates an execution plan for executing the database query. The execution plan comprises a plurality of operators and includes instructions for a plurality of join strategies. The database system allocates a set of threads for executing operators of the execution plan. The database system processes the database query by streaming data through the operators of the execution plan by performing following steps. The database system determines a size of the hash table. The database system selects a join strategy from the plurality of join strategies based on the size of the hash table. The first thread communicates data via the blocking channel to the second thread to distribute one of the scan table or the hash table according to the selected join strategy.

According to an embodiment, a join strategy is selected from the plurality of join strategies responsive to the size of the hash table being below a threshold value. The join strategy distributes the hash table across servers of the cluster of servers and performs local scan at each server to join a portion of the scan table with the hash table.

According to an embodiment, a join strategy is selected from the plurality of join strategies responsive to the size of the hash table exceeding a threshold value. The join strategy partitions the hash table across servers of the cluster of servers and performs a distributed join at each server to join a portion of the scan table with the hash table.

Embodiments of a computer readable storage medium store instructions for performing the steps of the above method. Embodiments of the computer system comprise one or more computer processors and a computer readable storage medium store instructions for performing the steps of the above method.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The teachings of the embodiments can be readily understood by considering the following detailed description in conjunction with the accompanying drawings.

Figure 1:
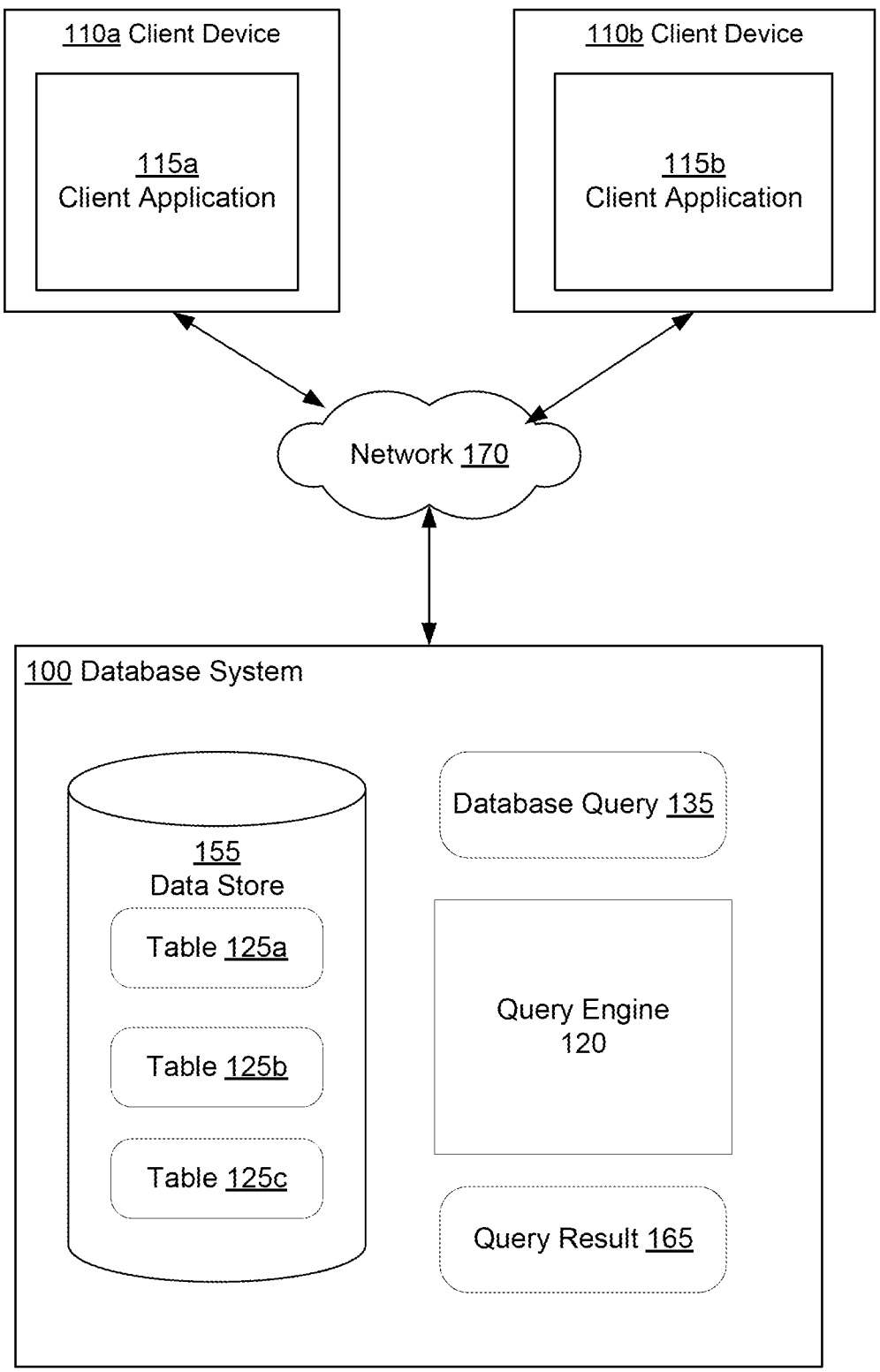
FIG. 1 is a block diagram of a system environment in which a database system operates, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Database systems use query engines to process database queries. A query engine receives a database query and generates an execution plan for processing data as specified by the database query. The execution plan includes one or more operators that represents operations, for example, filter operator for performing filter operation, sort operator for performing sort operation, and so on.

An operation performed for processing a database query may be a linear operation that represents operations in which a single operation depends on the output of the linear operation. An operation may be non-linear such that multiple operations depend on the output of the non-linear operation. For non-linear operations the database system has to ensure that the output of the non-linear operation is available for each operation that depends on the output, no matter when the output is processed by these operations. As a result, the system has to buffer the output of the non-linear operation until all operations using the output have processed the output. This may result in the output data of the non-linear operation being buffered for a long period of time or recomputed.

A database system may use a push model to process database queries or a pull model to process database queries. Data is produced by a producer operation and consumed by a consumer operation. In a pull model, data processing is driven by the consumer operation while in the push model it is driven by the producer operation. If the query engine is based on a push model then a preceding operation initiates processing in successive operations. A pull based model requires data to be buffered if a producer produces output that is used by multiple consumers since the producer has to wait for each consumer to retrieve the output data.

Similarly, if a single operation depends on output of multiple operations, a push model based database system has the same problem as a pull based system with operation that is producing output for multiple other operations. Accordingly, a producer in a push based model has to buffer data until the consumer has received all required data and is able to proceed with the processing.

Database systems often run operations in stages where each stage represents one or more operations of the execution plan of a database query. A stage is started when a set of previous stages have completed execution. A scheduler supervises the coordination of these stages. In these systems, large amount of data may have to be buffered as discussed herein, particularly for processing non-linear operations. Furthermore, significant overhead may be encountered due to synchronization using the scheduler.

Embodiments use blocking channels between operations where dataflow is non-linear. Accordingly, the database system processes execution plan of a database query by placing blocking channels between operations that are processed by threads. The database system may place blocking channels before operations that expect multiple inputs. The database system may place blocking channels after operations that are producing multiple outputs.

Use of blocking channels eliminates the need for any other execution coordination system or need to process queries in stages. This reduces synchronization overheads that are introduced by coordination systems. Use of blocking channels ensures that processing of a given operation happens only when all required inputs are ready. Furthermore, use of blocking channels ensures that an operation produces outputs only when all receivers are ready. Using channels ensures that there is no active waiting needed on any thread involved in data processing thus eliminating waste of CPU cycles. In database systems that perform processing in stages, work may not get divided evenly between threads and the finishing stage might wait for a single thread that had more work to perform. In contrast, the database system according to various embodiments disclosed herein performs streaming of data for processing the data through the query execution plan instead of processing data in stages. As a result, the database system is able to perform the next operation as soon as any data is available, without waiting for all data being processed by the previous operation. The blocking channels allow all the data flow to proceed using streaming such that a thread waits only when needed, thereby avoiding unnecessary synchronization overhead that is encountered in database systems using stage based processing. Furthermore, since data is streamed, the system does not need to store large amount of data in memory at the same time. This makes the processing of the queries efficient in terms of resource consumption, for example, in terms of memory consumption.

As an example, assume that a query processes an input table having N rows (e.g., N=1 billion rows) by computing a projection of each row and then grouping the rows by a particular column that has M distinct values (e.g., M=1 thousand distinct values). A database system with a query engine that uses synchronized stages stores the entire set of N rows after performing the projection to be able to perform the grouping. In contrast, the system according to an embodiment as disclosed is able to stream the rows of the input table and perform the grouping operation as and when the projected rows are available. As a result, the system as disclosed does not require additional memory to store the input table after performing projection operation.

System Environment

FIG. 1 is a block diagram of a system environment in which a database system operates, in accordance with an embodiment. The system environment 105 comprises a database system 100, one or more client devices 110, and a network 170. The system environment 105 may include multiple client devices 110. Other embodiments may have more of fewer systems within the system environment 105. Functionality indicated as being performed by a particular system or a module within a system may be performed by a different system or by a different module than that indicated herein. A database system may also be referred to herein as a system or as a database management system.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110n" in the figures).

The database system 100 includes a data store 155 that stores data processed using database queries. In an embodiment, the database system 100 is relational database system and the data is stored as relational tables 125a, 125b, 125c, and so on. In other embodiments, the database system 100 can process data stored in any other format, for example, an object-based database system that stores data as objects. The database queries may be specified using a query language, for example, SQL (structured query language) but are not limited to SQL.

Client applications 115a, 115b running on client devices 110a, 110b interact with the database system 100 to process the data stored in the data store 155. A client application 115 running on a client device 110 may send a database query 135 to the database system 100. The query engine 120 of the database system 100 executes the database query 135 to process the data stored in the data store 155 and determine a query result 165. The database system 100 returns the query result 165 to the client application 115. The system streams the query result to the client application to avoid having to buffer the query result data.

A client device 110 is a computing device such as a personal computer (PC), a desktop computer, a laptop computer, a notebook, or a tablet PC. The client device 110 can also be a personal digital assistant (PDA), mobile telephone, smartphone, wearable device, etc. The client device 110 can also be a server or workstation within an enterprise datacenter. The client device executes a client application 115 for interacting with the search system 100, for example, a browser. Although, FIG. 1 shows two client devices, the system environment 105 can include many more client devices 110.

The network 170 enables communications between various systems within the system environment 105, for example, communications between the client device 110 and the database system 100. In one embodiment, the network uses standard communications technologies and/or protocols. The data exchanged over the network can be represented using technologies and/or formats including, the HTML, the XML, JSON, and so on.

System Architecture

Figure 2:
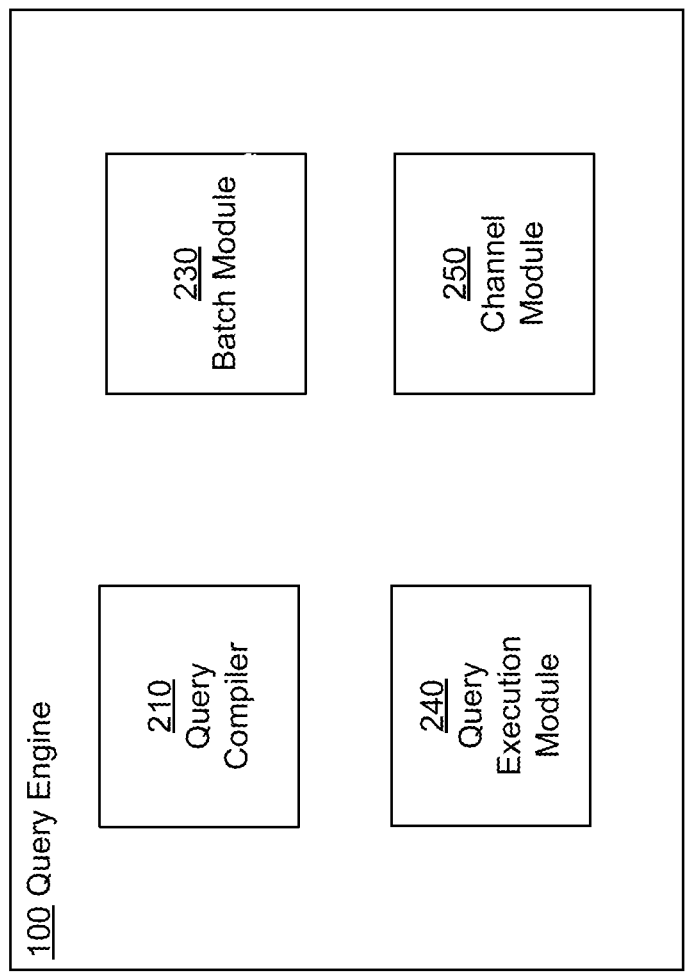
FIG. 2 shows the system architecture of a database system, in accordance with an embodiment.

FIG. 2 shows the system architecture of a database system, in accordance with an embodiment. The database system 100 comprises a query compiler 210, a batch module 230, a query execution module 240, and a channel module 250. Other embodiments of the database system 100 may include more of fewer modules.

The query compiler 210 parses a database query and generates a query execution plan for executing the database query. In an embodiment, the execution plan for executing a database query comprises a set of operators. An operator receives one or more data input elements, performs an operation using the one or more data input elements and generates one or more output data elements. Examples of operators include filter operator to filter rows, a transform operator to transform an input value based on a function or a set of instructions, a group by operator to group input elements by a key, and so on. The output generated by an operator O1 may be provided as input to another operator O2. Accordingly, the query execution plan may be considered a graph of operators where each node is an operator and an edge represents transfer of data from one operator to another operator. An operator may also be referred to herein as a query processor. According to an embodiment, each operator is implemented as a QueryProcessor object that implements a method process( ) that performs the processing of the operator and returns a Result object. The result of execution of method process( ) may be SUCCESS indicating that the method was executed successfully; ERROR indicating that an error was encountered during the processing; PROCESSING indicating that no result is produced yet.

The batch module 230 generates and processes batches of data being processed. A batch may store a set or rows of data obtained from data store 155. A batch may store data from a single column in continuous memory region. A batch may store an array of arrays for each column type. The first index may represent a column id (identifier) of a particular type and the second index may represent a row id, for example, i32columns[c_id] [r_id] contains value for column with 32 bit integer type with column id c_id for row with row id r_id.

The channel module 250 manages channels. A channel represents a data structure or a mechanism used for sending batches of data between threads processing the query. Details of a channel are illustrated in FIG. 3 and described in connection with FIG. 3.

The query execution module 240 builds a pipeline comprising a set of threads for executing a query. Each thread many process one or more operators of the query execution plan. A thread executes the process( ) method of a QueryProcessor repeatedly while there is input data that needs processing. A QueryProcessor representing an operator may use output of another QueryProcessor. A query execution plan chains a set of QueryProcessor objects to achieve complex query processing.

Figure 3:
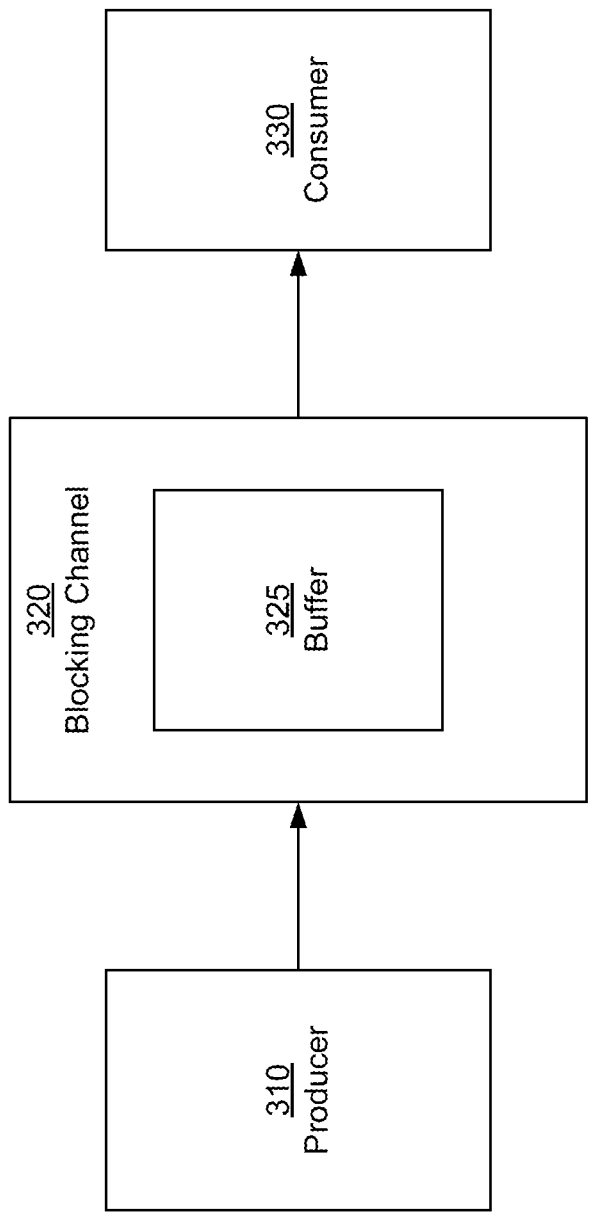
FIG. 3 illustrates a blocking channel placed between a producer and a consumer, in accordance with an embodiment.

FIG. 3 illustrates a blocking channel placed between a producer and a consumer, in accordance with an embodiment. The blocking channel 320 receives data from the producer 310 and provides the data to the consumer 330.

Each producer 310 and consumer 330 may be a thread processing one or more operations of a database query such that an operation processed by the producer 310 provides output that is processed by the consumer 330. A blocking channel has a limited capacity to store data. For example, the blocking channel 320 has a fixed size buffer 325 for storing data. The blocking channel 320 supports following three operations.

The blocking channel 320 supports a push operation that allows a producer 310 to send data to the blocking channel 320. The push operation places data in the buffer 325 if there is capacity to store data, or else the push operation causes the sender of data to block execution until there is space in the buffer 325 to store new data. For example, if the buffer 325 is filled up to the capacity with data, the producer 310 gets blocked when the producer 310 attempts to send more data via the blocking channel 320. The producer 310 remains blocked until the buffer 325 has room to accommodate additional data, for example, after the blocking channel 320 has provided some of the data to the consumer 330.

The blocking channel 320 supports a pull operation that allows a consume 330 to retrieve (or receive) data from the buffer 325 of the blocking channel 320. The pull operation removes data from the buffer 325 if the buffer 325 is not empty, otherwise the pull operation causes the consumer to block execution until some data is available in the buffer. Accordingly, the consumer 330 blocks if it attempts to receive data from the blocking channel 320 and the buffer 325 is empty. The consumer 330 remains blocked until the buffer 325 gets some data for providing to the consumer 330, for example, after the buffer 325 receives data pushed by the producer 310.

The blocking channel 320 also supports a close operation that disables pushing and pulling data to the blocking channel 320 channel. All operations (i.e., threads executing the operations) blocked while trying to push or pull data to a channel are unblocked and notified that the channel is closed.

A blocking channel can be implemented as a structure that can be used to exchange data between threads on local server. For example, the database system may implement a buffer and control access to the buffer using a mutual exclusion object (mutex) and condition variables. A mutex is a program object that allows multiple threads to share a resource, such as a buffer of a blocking channel, but not simultaneously. A thread that needs the resource (e.g., the buffer of the blocking channel) must lock the mutex from other threads while it is using the resource. When a thread T1 is blocked during a push operation, the thread T1 is awaken when another thread T2 performs a pull operation that frees space in the channel's buffer. The system uses a condition variable to achieve this.

Alternatively, a blocking channel or can be implemented using a network a protocol such as TCP/IP (Transmission Control Protocol/Internet Protocol) or any other network protocol with congestion control for example, QUIC (Quick UDP Internet Connections) for exchanging data between threads on different servers. Congestion refers to a state occurring in a computer network when the message traffic is so heavy that it slows down network response time. A network protocol may implement a congestion control technique to prevent occurrence of congestion in the network. Any such network protocol can be used for implementing a blocking channel between threads that communicate via computer networks.

In order to achieve high performance of the query engine the system attempts to utilize all physical cores of CPU (central processing units) of all servers within a cluster of servers running a database query. The database system executes a database query by executing a set of operations on data. Each operation processes a small portion of data at each iteration. The database system executes a database query by performing many iterations of a given operation.

Operations can be categorized into following categories. A source operation generates data. The source operation may read data from a source, for example, from storage or an external input for example, a data stream generated by sensors of an IoT (internet of things) based system. A source operation may also generate data. A source operation does not depend on other operations.

A sink operation does not produce output for any other operation. For example, a sink operation may send data to a module or system outside the query engine. For example, the sink operation may print data on a display device, write to a file, or transmit data to a different system via network.

A processing operation transforms incoming data to produce an output data based on the incoming data. Processing operations can be linear operations or non-linear operations. A linear operation has a single input and a single output. A non-linear operation has multiple inputs or multiple outputs or both. For example, multiple operations can provide input to a non-linear processing operation. Alternatively, or in addition, a non-linear processing operation may provide output to multiple other operations. A processing operation may also be referred to herein as a processor.

Figure 4:
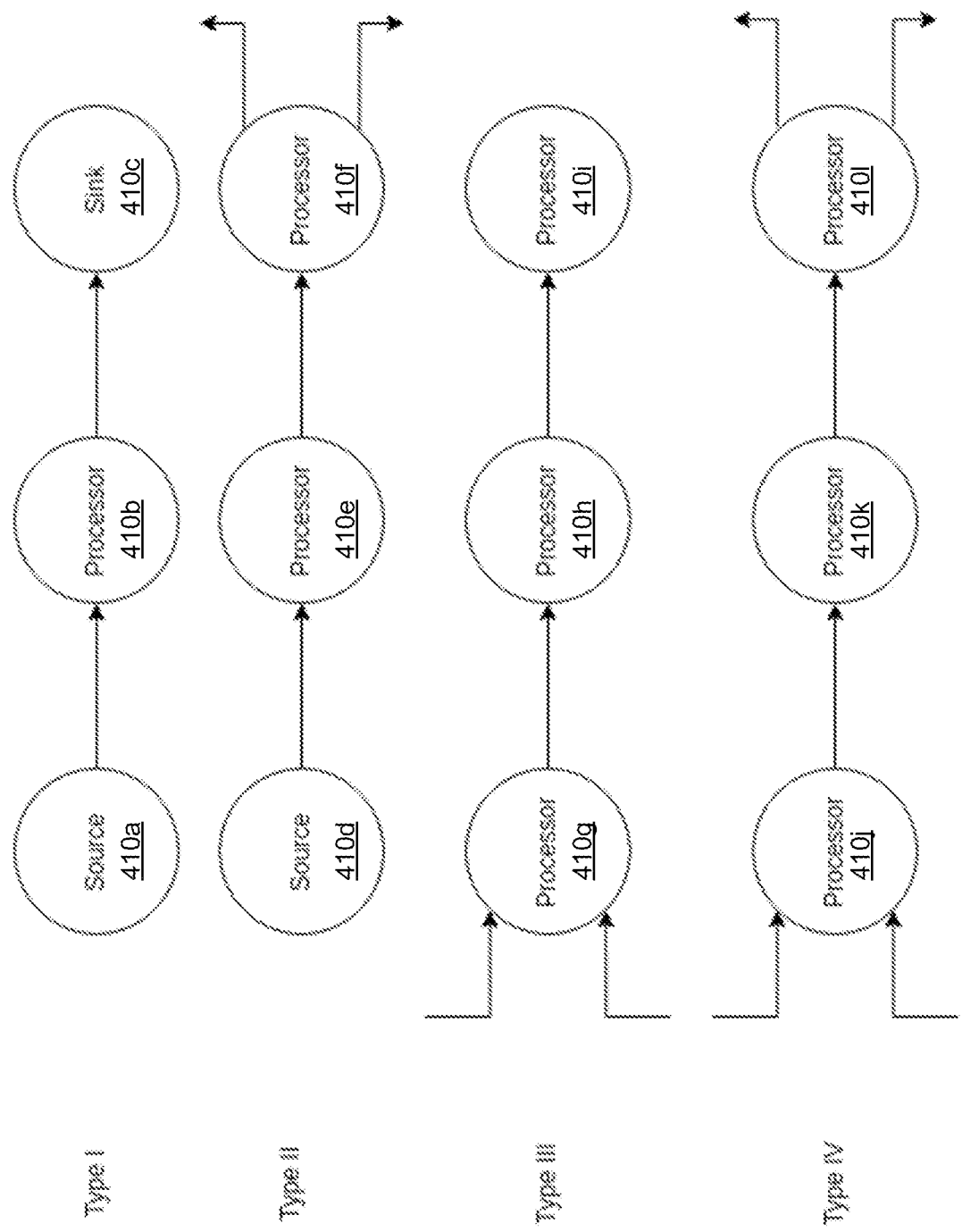
FIG. 4 illustrates various types of operator sequences that may be processed by a thread, in accordance with an embodiment.

The database system generates an execution plan comprising a set of operations for executing a database query. The database system runs threads for executing one or more operations. The threads communicate with other threads as specified by the execution plan of the database query. The database system introduces blocking channels between threads. For example, the database system may place a blocking channel before a thread that processes an non-linear operation that receives multiple inputs. Accordingly, each input coming to the non-linear operation from another operation provides data to the non-liner operation via the blocking channel. The thread that is pushing data through the channel automatically blocks when the buffer of the blocking channel is full. The system allocates a separate channel for each input to avoid deadlocks. Typically, all threads feeding into a channel perform similar computation on different parts of a table and the channel can accept input from any of the threads FIG. 4 illustrates various types of operation sequences that may be processed by a thread, in accordance with an embodiment. The type I operation sequence includes a source operation 410a that provides data to a linear processing operation 410b which in turn provides data to a sink operation 410c. The type II operation sequence includes a source operation 410d that provides data to a linear processing operation 410e which in turn provides data to a non-linear processing operation 410f that has multiple outputs. The type III operation sequence includes a non-linear processing operation 410g that with multiple inputs that provides data to a linear processing operation 410h which in turn provides data to another linear processing operation 410i. The type IV operation sequence includes a non-linear processing operation 410j that with multiple inputs that provides data to a linear processing operation 410k which in turn provides data to another non-linear processing operation 410l with multiple outputs.

A thread runs steps of the various processing operations assigned to it. A set of consecutive operations from an execution plan generated for a database query is assigned to a thread. A processing operation that receives one or more inputs pulls data from the other processing operations providing the inputs. If the last processing operation of the sequence assigned to a thread is not sink, the thread pushes the output generated by the last processing operation to a blocking channel that connects the thread to one or more other threads. A thread finishes execution when the last processing operation of the sequence assigned to the thread finishes processing the data received by the processing operation. In general, a thread blocks if the first operation of the thread does not have input or if there is no room in the buffer of the blocking channel fed by the last operation of the thread.

Accordingly, threads start processing when their first operation has data ready for processing and will not flood operations down the processing pipeline with large amounts of data if the downstream threads are not ready for accepting new portions of data.

Processes

Figure 5:
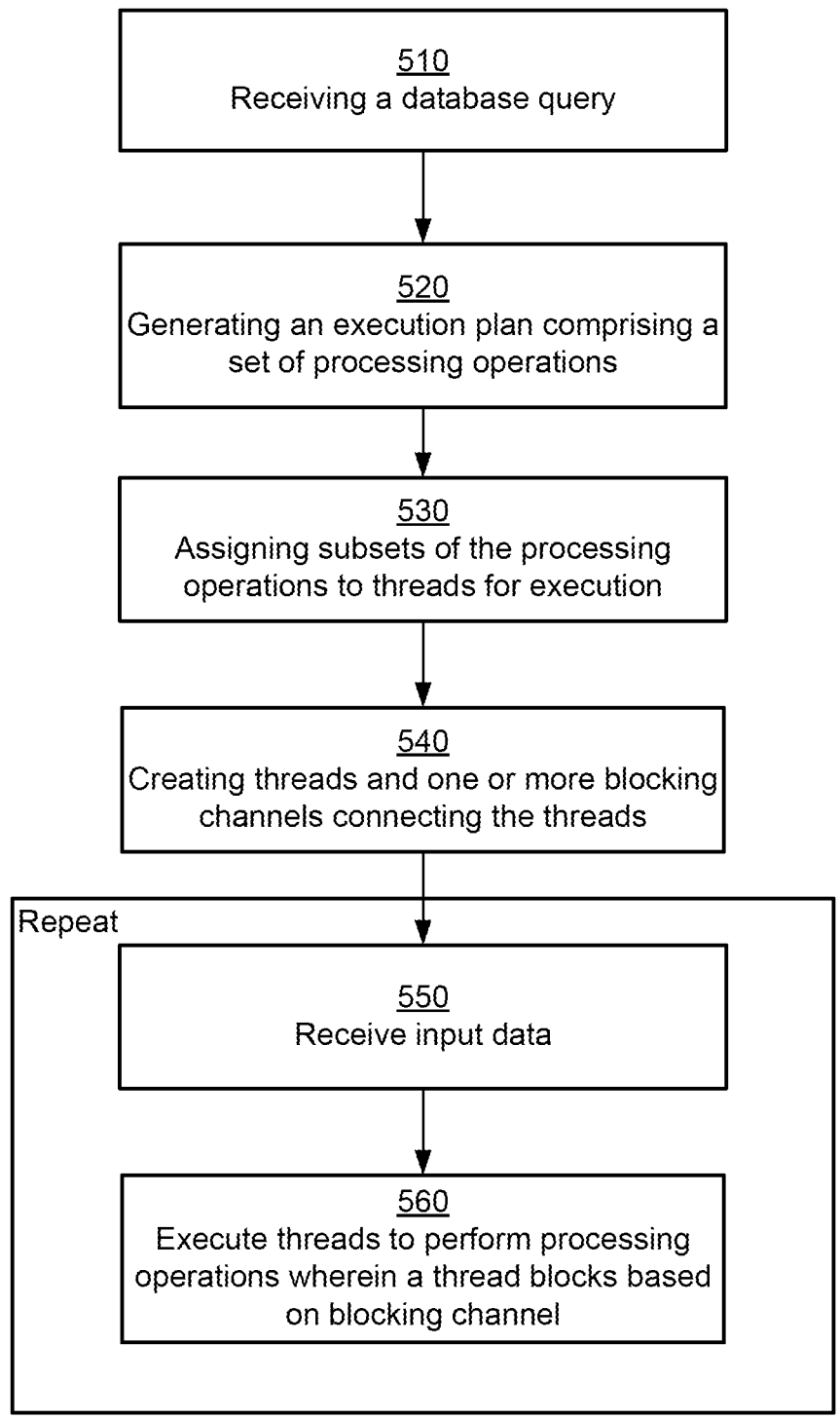
FIG. 5 is a flowchart of the process of execution of a database query, in accordance with an embodiment.

FIG. 5 is a flowchart of the process of execution of a database query, in accordance with an embodiment. The steps shown in this process can be executed in an order different from those shown in the flowcharts. Furthermore, various steps can be executed by modules other than those indicated herein.

The database system receives 510 a database query that processes data stored in one or more tables. The database system generates 520 an execution plan comprising a set of processing operations. The processing operations form a graph where the nodes are the processing operations and there is an edge from node N1 representing an operation O1 to a node N2 representing an operation O2 if the operation O1 generates output data that is provided as input to the operation O2.

The database system assigns 530 subsets of processing operations to threads for execution. The database system identifies consecutively occurring operations in the execution plan for assigning to a thread, i.e., a subset of processing operations such that there is a direct edge between any processing operation and at least one other processing operation of the subset.

An execution plan for a database query comprises stages, each stage representing a sequence of operations executing within a single thread, starting with a source or channel and ending with sink or channel. According to an embodiment, for a stage, e. g. projection, the system allocates as many threads as there are logical cores on the CPU (central processing unit). Each thread executes the operations of the stage on a different part of the data. Accordingly, each operation of an execution plan is executed on every single logical core of the CPU. Because an execution plan may have more 'stages' than cores of the CPU, the system may allocate more threads than the number of logical cores. Typically, most of the threads are likely to be waiting for data in channel.

The database system creates 540 the threads for execution of the database query. The database system includes blocking channels between threads. The database system may include a blocking channel before a non-linear processing operation with multiple inputs. The database system may include a blocking channel after a non-linear processing operation with multiple outputs.

According to an embodiment, the system assigns a set of consecutive linear operators of the execution plan to the same thread. The system introduces blocking channels before or after non-linear operators. For example, the system may introduce a blocking channel before a non-liner processor with multiple inputs and after a non-linear processor with multiple outputs. The system does not introduce a channel before a non-linear processor that processes multiple inputs that can be processed sequentially. Processors with multiple inputs that can be processed sequentially process the individual inputs one by one, for example, by processing the first input, followed by the second input, followed by the third input, and so on without using blocking channels.

The database system processes the database query by repeating the steps 550 and 560 until there is no more data for processing. The database system receives 550 data using the source processing operations. For example, a source processing operation may provide data as rows (or tuples). Each thread performs the execution if there is all the required data available for an operation assigned to the thread. A thread blocks if the thread is providing data to another thread via a blocking channel and the buffer of the blocking channel is full. A thread also blocks if the thread is waiting for input data for an operation from another thread via a blocking channel and the buffer of the blocking channel is empty. The steps 550 and 560 are executed until all input data is processed.

Although the embodiments described herein are based on processing of data stored in tables, the techniques disclosed are applicable to queries based on data stored in other formats, for example, key value stores, object-based databases, data stored as files, and so on.

Operation Specific Optimizations: Grouping

Figure 6:
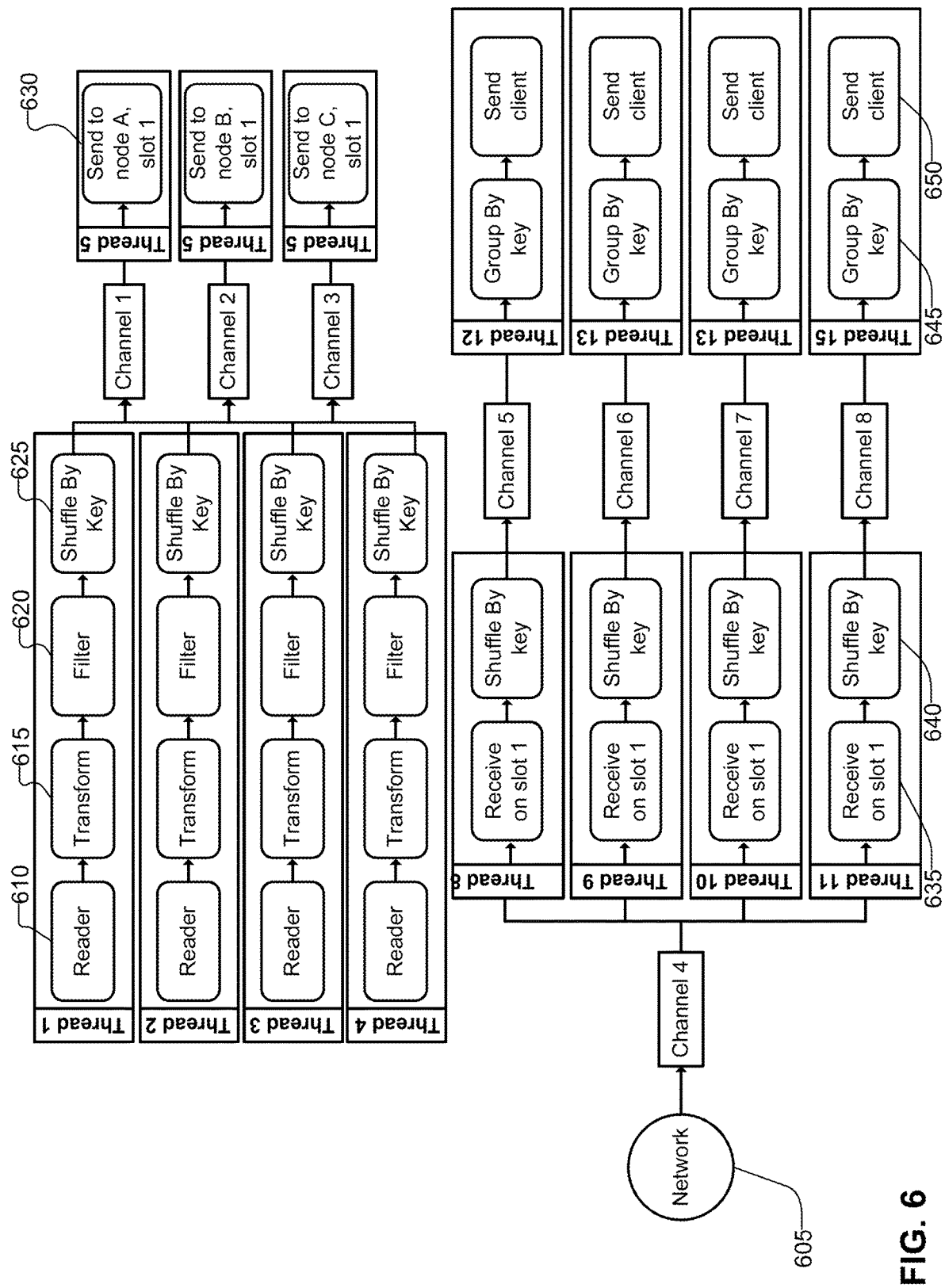
FIG. 6 illustrates execution of a database query including grouping operations, according to an embodiment.

FIG. 6 illustrates execution of a database query including grouping operations, according to an embodiment. An example database query is received by the database system. The database query includes a WHERE clause and a GROUP BY clause and performs operations including transformation, filtering, and grouping. The example database system runs on a cluster with three nodes, where each node includes a CPU with 4 cores. In the example configuration, the database system allocates four threads to process the incoming data concurrently in each node. The database system generates an execution plan based on the database query and allocates threads and blocking channels to execute the execution plan. The execution plan represents a pipeline including reader operator 610, transform operator 615, filter operator 620, group by operator 645, and so on. The database system allocates a set of threads for executing the pipeline, for example, four threads 1, 2, 3, and 4 running the pipeline in parallel. The reader operator 610 reads the data from a source, for example, a storage system; the transform operator 615 performs transformation of the data read, for example, a projection operation; the filter operator 620 filters rows based on certain criteria specified in the database query. Since there are three nodes in the cluster, each thread performs a shuffle operation 625 that shuffles the rows based on the key and sends to the appropriate node to which the key maps. Accordingly, the shuffle operation causes the rows to be mapped to nodes based on the key. The configuration of threads and channels shown in FIG. 6 is present on each server representing a node of the cluster. The threads 5, 6, and 7 send 630 the data to the nodes A, B, and C respectively. The channels 1, 2, and 3 are used for providing data to the threads 5, 6, and 7 respectively. The send operator 630 represents a non-linear operation since multiple inputs are received by each send operator. Accordingly, the database system performs the communications between the set of threads 1, 2, 3, and 4 and the set of threads 5, 6, 7 using blocking channels 1, 2, and 3. Each of the blocking channels 1, 2, 3 receives inputs from all the threads of the set 1, 2, 3, and 4 and provides output to the corresponding thread 5, 6, 7 respectively. The blocking channels controls the dataflow between the shuffle operator 625 and the send operator 630. Accordingly, if the buffer of any channel 1, 2, 3 is full, the thread attempting to send the data to the channel blocks until the channel is able to send the data to the corresponding node, thereby creating space in the buffer. This allows the execution of the database query to be performed by streaming the rows of the input table.

Each node receives the data sent by the threads 5, 6, 7, into channel 4. The communication between threads 5, 6, 7 and threads 8, 9, 10, 11 occurs via a network 605. The blocking channel 4 receives data from each of the threads 5, 6, 7 and cause a thread sending the data to block if the buffer of the channel 4 is full. Each of the threads 8, 9, 10, 11 includes a receive operator 635 to receive the data and a shuffle operator 640 to shuffle the data based on the key to assign the data to the right thread 12, 13, 14, 15 within the node to perform the group by operation using the group by operator 645. The final result of grouping is sent using the send operator 650 to the entity that sent the request, for example, a client application 115 running on a client device 110. The shuffle operator 625 shuffles the data globally between the nodes and the shuffle operator 640 shuffles the data within each node to assign the data to a thread corresponding to a CPU core where the group by operator 645 performs the aggregation for the respective group.

The use of streaming of data during the processing of the database queries allows the execution plan to monitor the characteristics of the data being processed as it is received and modify the execution strategy during execution of the database query. For example, the database query may start execution with a particular data distribution strategy for a portion of the data or for a data structure such as a hashmap built during the execution. The distribution strategy may depend on certain characteristics of the input data, for example, size of an input table, number of unique values of a key, and so on. Typical database systems estimate the characteristics of the input data to determine a data distribution strategy and generate an execution plan based on that particular data distribution strategy. If the actual data received during the execution of the database query does not have the required characteristics, these database systems continue using the execution plan that is based on incorrect assumptions of the data. As a result, the performance of the database query is poor since a suboptimal execution plan is used. In contrast, the database system according to various embodiments disclosed uses streaming of data and monitors the characteristics of the data as it is received. The database system is able to determine the execution strategy to be used, for example, the data distribution strategy at runtime after the execution of the database query has already started. As a result, the database system as disclosed is able to determine the optimal data distribution strategy and the corresponding execution plan for a database query. Furthermore, different inputs processed by the same database query may have different distribution characteristics. The database system is able to execute the database query for different inputs such that the characteristics of each input are determined at runtime and the data distribution strategy selected at runtime such that the data is mapped appropriately for execution. Furthermore, if the characteristics of the input data are determined to change as the data is processed, the database system is able to adjust the data distribution strategy. For example, the database system may determine that the input data has a first set SI of characteristics and accordingly use data distribution strategy D1. For example, the characteristics may represent unique number of keys and the database system may determine that the unique number of keys is below a threshold value and accordingly use a distribution strategy D1. However, if the database system continues reading the input data and later determines that the unique number of keys exceeds the threshold value, the database system may perform redistribution of data according to a different data distribution strategy D2. Accordingly, even though there may be some overhead of redistributing the data, if the size of the input data is large, the overall execution time is improved for most database queries as a result of redistribution of the data due to the user of the optimal data distribution strategy. The ability to change the data distribution strategy at runtime is enabled due to the user of streaming of data and use of blocking channels to control the data blow across threads. The use of blocking channels allows the database system to perform streaming of data and process the data without storing large amounts of data in buffers.

Figure 7:
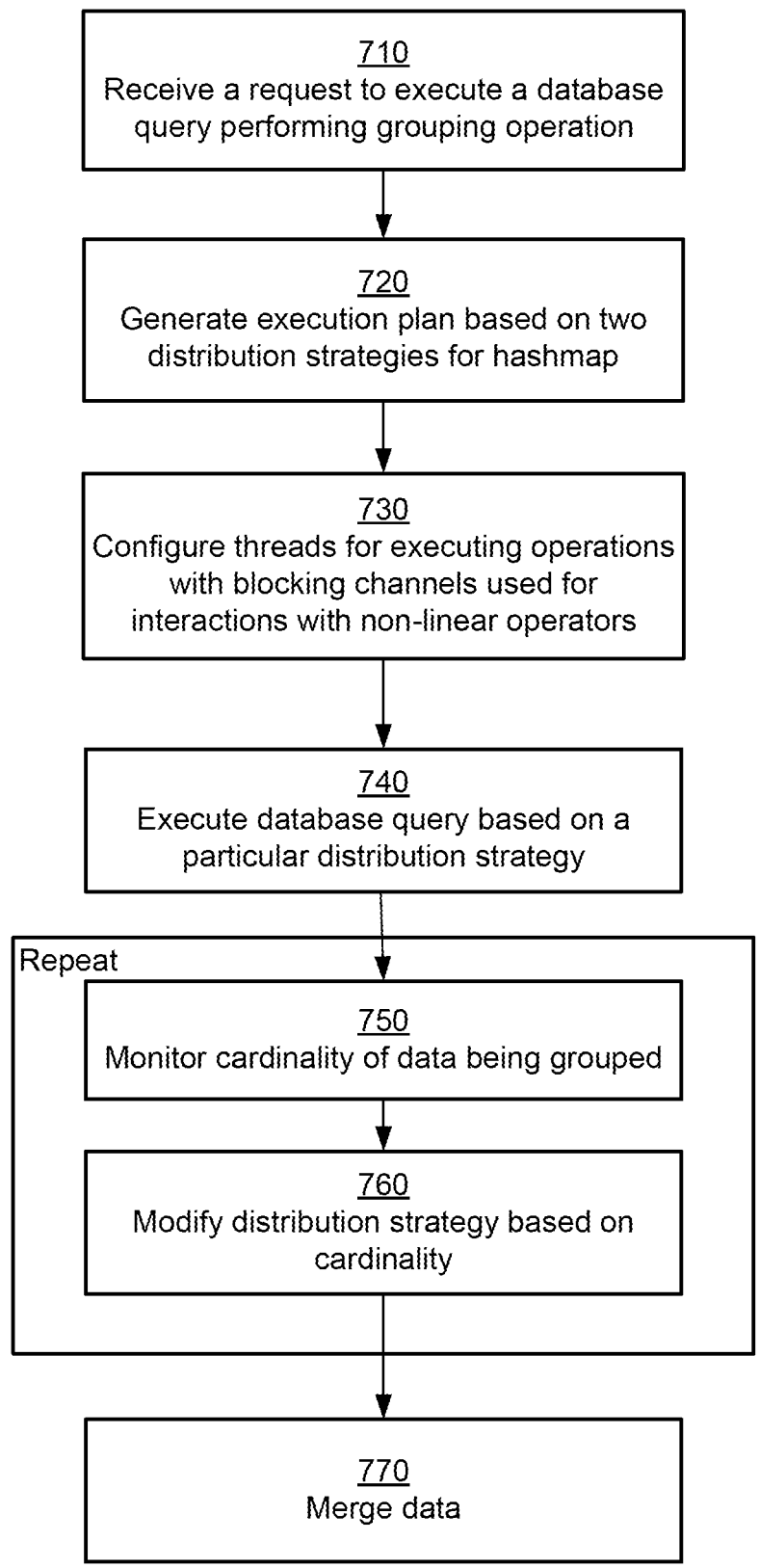
FIG. 7 shows a process illustrating the processing of a database query that performs grouping of data, according to an embodiment.

FIG. 7 shows a process illustrating the processing of a database query that performs grouping of data, according to an embodiment. The database system receives 710 request to execute a database query that performs grouping based on a key, i.e., the database query specifies a GROUP BY operation. The database system uses a hashmap data structure to perform hash group by. The memory usage and performance of hash group by depends on number of unique keys, i.e., values in columns used in group by clause of database query. If the number of unique keys is high the memory usage is also high resulting in slower execution. To lower the memory usage per server, a distributed system can shuffle the data among servers so that each server performs grouping of a subset of keys so that the number of keys processed per server is low. This technique requires sending all input data to other servers which may have poor performance depending on the number of rows being processed and the network bandwidth.

The database system according to an embodiment generates 720 a query execution plan for the database query that implements multiple data distribution strategies, for example, the query execution plan may implement two data distribution strategies. The database system uses a first data distribution strategy D1 if the number of unique keys is less than the number of rows by a threshold value t1. According to D1 distribution strategy, each server performs grouping of the data allocated to the server locally and then shuffles the partial results for performing a final merging of the partial results to obtain the overall result of the database query. The database system uses a second data distribution strategy D1 if the number of unique keys is high, i.e., greater than the number of rows by a threshold value t2. According to D2 distribution strategy, each server is allocated a subset of keys for performing grouping operation. Accordingly, since there is a high number of unique keys in relation to the number of rows, each server shuffles the data allocated to the server to all the remaining servers of the cluster so that each server gets all the data and performs group by operation just for a subset of keys. Typical systems use heuristics to estimate the cardinality of the key before execution of the database query starts and use the estimated value to select a distribution strategy and generate an execution plan based on the selected distribution strategy. The database system according to various embodiments disclosed is able to generate a query execution plan based on both strategies and selects the data distribution strategy used for processing an input after the execution of the database query has started so that the database system has an accurate estimate of the number of unique keys and the number of rows of the input being processed. The database system configures 730 threads for executing the operations of the execution plan along with blocking channels for implementing interactions between threads performing non-linear operations. The number of threads for performing specific operations may depend on various factors, for example, the number of CPU cores of the servers processing the data, number of servers in the cluster and so on. For example, the number of threads used for performing filtering, transformations, and grouping operations may depend on the number of CPU cores in each server so that each CPU core may process a subset of data in parallel. The number of threads used for performing communication of data to other servers depends on the number of servers in the cluster. The send operation that sends data to other servers of the cluster is a non-linear operation that receives input from multiple threads performing read, transform and other operations on the input data. Accordingly blocking channels are used for sending data from threads processing the input data to the send operator. Similarly, blocking channels are used by threads receiving data from the send operator. A set of source threads may communicate with a set of target threads via a set of blocking channels such that the number of blocking channels in the set of blocking channels depends on factors including the number of source threads in the set of source threads or the number of target threads in the set of target threads. If the system uses channels before sending data than each recipient is assigned a single channel. If the system uses channels to shuffle data between threads, the system allocates as many channels as there are threads.

The database system starts executing 740 the database query based on a particular distribution strategy, for example, D1 if the initial key cardinality is determined to be low. The database system continues to monitor 750 the cardinality of the keys and the number of rows being processed. The database system may modify 760 the data distribution strategy from D1 to D2 or from D2 to D1 if the monitored cardinality of the keys and the number of rows is determined to change in a manner that the selection of the data distribution strategy changes. The database system merges 770 the partial grouping of data that is performed to obtain the final result for sending to the entity that requested the results.

According to an embodiment, the database query execution plan uses three operators: a pre-aggregator operator. A post-aggregator operator, and a merger operator. Every tuple or row of input data is processed by the pre-aggregator operator. The pre-aggregator operator may execute in one of two possible states: an aggregation state and a passing data state. The aggregation state is the starting state of pre-aggregator in which the execution is initially started. In this state, the pre-aggregator operator aggregates data using a hashmap data structure that stores a hashmap key corresponding to each unique key of the input data. If the size of the hashmap exceeds a certain threshold or if there is no more data to be processed, then the pre-aggregator shuffles the aggregated partial results and sends to the merger operator for final merging of the partial results. If the ratio of rows aggregated since previous flush and the size of hashmap is low, then pre-aggregator changes state to passing data state. In the passing data state, the pre-aggregator shuffles the and passes the data to the post-aggregator operator. Various embodiments may estimate cardinality of data using various techniques, for example, HyperLogLog algorithm. If the database system detects that the cardinality of input data has decreased below a certain threshold then the pre-aggregator switches to aggregation state. The post-aggregator operator aggregates incoming data and pushes the data to the merger operator. The merger operator merges incoming data that represents partial result of aggregation for each key. Accordingly, the database system adapts to key distribution and aggregation strategy based on cardinality of data observed so far.

Operation Specific Optimizations: Join of Tables

Figure 8:
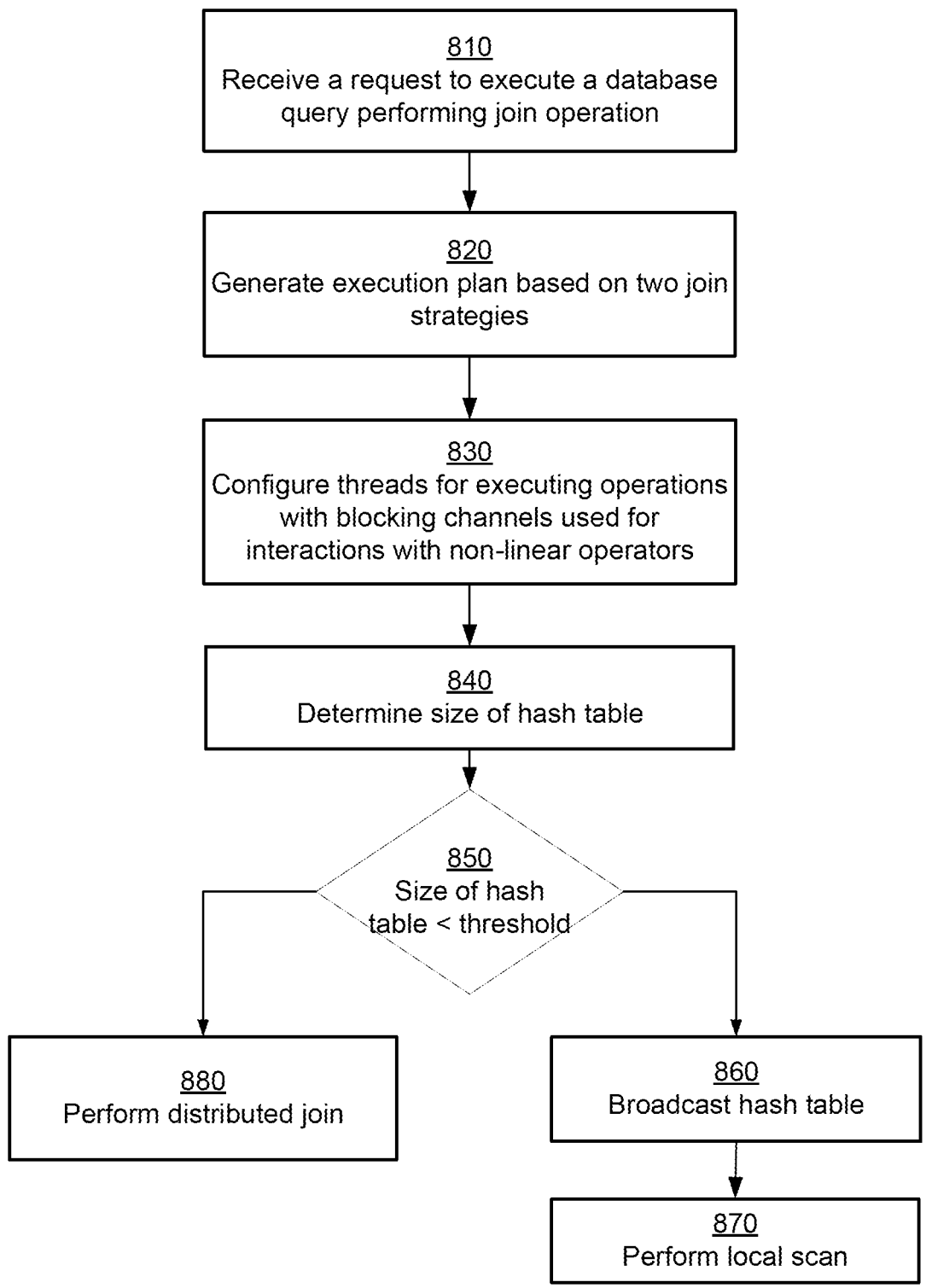
FIG. 8 shows a process illustrating the processing of a database query that performs join of tables, according to an embodiment.

FIG. 8 shows a process illustrating the processing of a database query that performs join of tables, according to an embodiment. The database system receives 810 a database query that performs join, for example, equi-join of two tables. The database query specifies two input tables and columns from each table used as condition of join for the two tables. The database system performs the equi-join using the hash join method that uses a hashmap to find matching rows between the two input tables. The hashmap is built using rows of one of the input tables. The hashmap key is determined based on the value of columns specified in the join condition of the database query. The database system then scans the other table for matches to the hash table, and joins data from the two tables based on the matches. The value stored in the hashmap is the value of the row of data matching the hashmap key or an index. The table used for building the hashmap is referred to as the hash table and the other table is referred to as the scan table. The performance and memory usage of the hash join depends on the number of rows in the hash table. The more rows are in the hash table the bigger is memory usage and slower execution of the hash join. Conventional database systems use heuristics to determine sizes of the input tables and determine which input table is used as a hash table and which input table is used as the scan table during a query planning stage, before the database system starts processing the input data for executing the database query.

The database system generates 820 an execution plan based on two possible join strategies and determines the join strategy used during runtime after processing at least some of the input data during the execution of the database query. A first join strategy J1 has lower memory usage per server distributed systems by shuffling data among servers. Each server is responsible for storing and processing a subset of the hashmap thus lowering the size of the hash table processed locally. This method requires sending all the input data from both tables to other servers which can negatively affect performance if network throughput is lower than computations throughput. The second join strategy J2 is called broadcast join and handles the issue with low network throughput when the hash table is small enough to fit in memory of each server. According to this join strategy, first each server sends a copy of their part of the hash table to each other server. Each server builds a hashmap using a full hash table and then processes the scan table without shuffling it within the cluster before. Accordingly, the database system uses an equi-join operator that implements both join strategies J1 and J2.

The database system configures 830 the threads for executing the various operations of the execution plan and uses blocking channels for performing interactions between at least some of the threads performing non-linear operations. Shuffling by keys is a non-linear operation for which the system uses blocking channels. The join operator is also non-linear since it has two inputs, left and right. The system uses blocking channels for processing the join operator. The use of channel allows processing of the join operator without having to coordinate between processing of scan side and hash side.

The database system determines 840 the size of the hash table. Each server pulls all the contents of the hash table available for that particular server and determines a size of the local hash table. The server sends the size of the local hash table determined to all other servers. Accordingly each server receives sizes of the local hash tables from every other server and determines the total size of the hash table based on the received values. Accordingly, each server is able to determine 840 the total size of the hash table.

The database system compares 850 the size of the hash table with a threshold value to determine whether the size of the hash table is less than the threshold value. If the size of the hash table is determined to be less than the threshold value, the database system performs step 860 or else the database system performs step 870. At step 860, each server broadcasts the hash table to all servers of the cluster. Accordingly, each server sends a copy of the part of the hash table stored at that server to every other server. Accordingly, each server to receives the remaining portions of the hash table from other servers and constructs the full hash table.

Each server performs 870 local scan based on the hash tale constructed. Accordingly, each server joins the locally available part of the scan table with the hash table. This completes the join process and the database system may send the data to an entity requesting the result of the database query.

If the size of the hash table is determined 850 to be not less than the threshold value, the database system performs 880 a distributed join. Accordingly, each server performs a distributed shuffle of hash table, receives a part of hash table mapped to that server. Each server performs distributed shuffle of the scan table so that the scan table is available at each server. Once the scan table is available at the server, the server performs join of the scan table with the part of the hash table mapped to the server. The results of the join are provided to an entity requesting the result of the database query.

Accordingly, if the total size of the hash table is small, the scan table is not distributed through the servers, thus saving network bandwidth. The ability to stream input data allows the database system to dynamically determine the join strategy used at runtime after the processing of the data is started during execution of the database query. For example, the database system does not have to guess the size of the hash table to determine the join strategy. Database systems that guess the size of the hash table, for example, using heuristics may determine an incorrect value of the size of the hash table, thereby choosing a suboptimal join strategy. In contrast, the database system as disclosed determines the accurate size of the hash table after the data of the hash table is read and is able to select the optimal join strategy.

Operation Specific Optimizations: Map-Reduce Operations

Although the embodiments are described using the equi-join operation described in FIG. 8 or the grouping operation described in FIG. 6 and FIG. 7 of database systems, the techniques disclosed may be applied to any type of map-reduce operation performed by a system that performs distributed processing, for example, analyzing tokens or keywords in documents or perform other analytical operations. The techniques disclosed are not limited to database systems and can be performed by other systems, for example, distributed systems. The system may perform a map-reduce operation that includes a map operation that performs filtering and sorting and a reduce operation that performs a summary operation, for example, aggregation. The system determines data distribution strategy to be used based on the characteristics of input data that is read, for example, after performing the map operation. The system may broadcast certain data or communicate portions of the input data to implement the selected data distribution strategy. The system may select a particular execution strategy based on the characteristics of the data and execute the strategy. The execution strategy may change across different executions of the query, depending on the characteristics of the data being processed.

The query execution strategies used at runtime may change between subsequent executions of the database query. For example, if the data of the input tables keep changing, the database system is able to adapt to the changes in input data and determine the optimal strategies for processing the database queries at runtime. For example, a multi-tenant system may execute the same query against different tenants, each tenant having different data of the input table. Accordingly, different execution strategy may be optimal for different tenants. The database system does not have to estimate characteristics for each tenant and generate a different execution plan for each tenant. The database system as disclosed is able to generate an execution plan that can use different query execution strategies (e.g., data distribution strategies, join strategies, or other strategies). The actual strategy used is selected at the time of execution of the database query after the database system starts processing the data. The use of streaming of data and blocking channels allows the system to retrieve only the necessary portion of input data to be able to determine the query execution strategy at runtime.

Architecture of Computer

Figure 9:
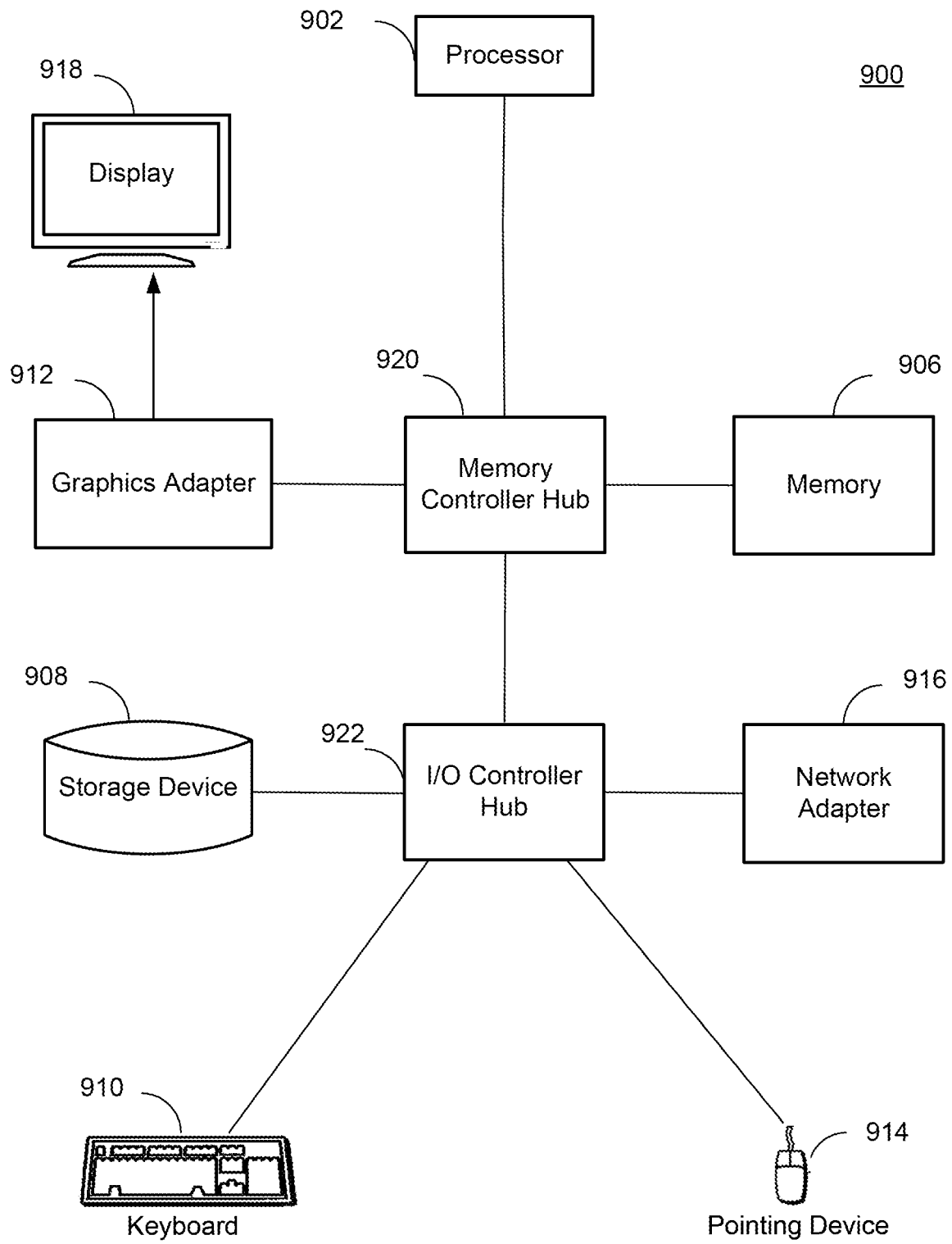
FIG. 9 shows an architecture of a computer that may be used for implementing a database system node, in accordance with an embodiment.

FIG. 9 is a high-level block diagram illustrating an example of a computer 900 for use as one or more of the entities illustrated in FIG. 1, according to one embodiment. Illustrated are at least one processor 902 coupled to a memory controller hub 920, which is also coupled to an input/output (I/O) controller hub 922. A memory 906 and a graphics adapter 912 are coupled to the memory controller hub 922, and a display device 918 is coupled to the graphics adapter 912. A storage device 908, keyboard 910, pointing device 914, and network adapter 916 are coupled to the I/O controller hub. The storage device may represent a network-attached disk, local and remote RAID, or a SAN (storage area network). A storage device 908, keyboard 910, pointing device 914, and network adapter 916 are coupled to the I/O controller hub 922. Other embodiments of the computer 900 have different architectures. For example, the memory is directly coupled to the processor in some embodiments, and there are multiple different levels of memory coupled to different components in other embodiments. Some embodiments also include multiple processors that are coupled to each other or via a memory controller hub.

The storage device 908 includes one or more non-transitory computer-readable storage media such as one or more hard drives, compact disk read-only memory (CD-ROM), DVD, or one or more solid-state memory devices. The memory holds instructions and data used by the processor 902. The pointing device 914 is used in combination with the keyboard to input data into the computer 900. The graphics adapter 912 displays images and other information on the display device 918. In some embodiments, the display device includes a touch screen capability for receiving user input and selections. One or more network adapters 916 couple the computer 900 to a network. Some embodiments of the computer have different and/or other components than those shown in FIG. 9. For example, the database system can be comprised of one or more servers that lack a display device, keyboard, pointing device, and other components, while a client device acting as a requester can be a server, a workstation, a notebook or desktop computer, a tablet computer, an embedded device, or a handheld device or mobile phone, or another type of computing device. The requester to the database system also can be another process or program on the same computer on which the database system operates.

The computer 900 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device, loaded into the memory, and executed by the processor.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

What is claimed is:

1. A computer-implemented method for executing database queries, the computer-implemented method comprising:
  receiving, by a database system, a database query for processing data stored in one or more input tables;
  generating an execution plan for executing the database query, the execution plan comprising a plurality of operators, wherein at least an operator receives data output by another operator or generates output provided as input to another operator;
  allocating a set of threads for executing operators of the execution plan, each thread processing one or more operators, the set of threads comprising at least a first thread executing a first operator and a second thread executing a second operator, wherein the first thread communicates with the second thread via a blocking channel, the blocking channel comprising a buffer of fixed capacity for storing data; and
  processing the database query by streaming data through the operators of the execution plan, wherein the first thread provides output of the first operator to the second operator of the second thread via the blocking channel, the processing comprising:
    sending, by the first thread, data generated by the first operator to the second thread executing the second operator via the blocking channel if the buffer of the blocking channel has available capacity to store the data, and
    blocking execution of the first thread if the buffer of the blocking channel is full, wherein execution of the first thread is blocked until the buffer of the blocking channel has capacity to store the data generated by the first operator.

2. The computer-implemented method of claim 1, wherein the blocking channel allows a thread to perform one or more of:
  a push operation that pushes data to the buffer of the blocking channel, wherein the push operation causes the thread to block if the buffer of the blocking channel is full; and
  a pull operation that pulls data from the buffer of the blocking channel, wherein the pull operation causes the thread to block if the buffer of the blocking channel is empty.

3. The computer-implemented method of claim 1, wherein the blocking channel is introduced between the first thread and the second thread responsive to determining that the second operator performed by the second thread receives inputs from multiple threads.

4. The computer-implemented method of claim 1, wherein the blocking channel is introduced between the first thread and the second thread responsive to determining that the first operator performed by the first thread sends the output of the first operator to multiple threads.

5. The computer-implemented method of claim 1, wherein the blocking channel is introduced between the first thread and the second thread responsive to determining that at least one of the first thread or the second thread performs a non-linear operator, wherein a non-linear operator performs at least one of: receiving of data from a first plurality threads or sending data to a second plurality of threads.

6. The computer-implemented method of claim 1, wherein the blocking channel is introduced between the first thread and the second thread responsive to determining that the first operator performed by the first thread performs a broadcast of data to a plurality of threads.

7. The computer-implemented method of claim 1, wherein the blocking channel is introduced between the first thread and the second thread responsive to determining that the second operator performed by the second thread performs an aggregation of data stored in a table.

8. The computer-implemented method of claim 1, wherein processing the database query further comprises:
receiving, by the second thread, data stored in the buffer of the blocking channel for performing the second operator if there is data available in the buffer of the blocking channel, and
blocking execution of the second thread if the buffer of the blocking channel is empty, wherein execution of the second thread is blocked until the buffer of the blocking channel has data available for processing by the second operator.

9. A non-transitory computer readable storage medium storing instructions that when executed by one or more computer processors, cause the one or more computer processors to perform steps comprising:
receiving, by a database system, a database query for processing data stored in one or more input tables;
generating an execution plan for executing the database query, the execution plan comprising a plurality of operators, wherein at least an operator receives data output by another operator or generates output provided as input to another operator;
allocating a set of threads for executing operators of the execution plan, each thread processing one or more operators, the set of threads comprising at least a first thread executing a first operator and a second thread executing a second operator, wherein the first thread communicates with the second thread via a blocking channel, the blocking channel comprising a buffer of fixed capacity for storing data; and
processing the database query by streaming data through the operators of the execution plan, wherein the first thread provides output of the first operator to the second operator of the second thread via the blocking channel, the processing comprising:
sending, by the first thread, data generated by the first operator to the second thread executing the second operator via the blocking channel if the buffer of the blocking channel has available capacity to store the data, and
blocking execution of the first thread if the buffer of the blocking channel is full, wherein execution of the first thread is blocked until the buffer of the blocking channel has capacity to store the data generated by the first operator.

10. The non-transitory computer readable storage medium of claim 9, wherein the blocking channel allows a thread to perform one or more of:
a push operation that pushes data to the buffer of the blocking channel, wherein the push operation causes the thread to block if the buffer of the blocking channel is full; and
a pull operation that pulls data from the buffer of the blocking channel, wherein the pull operation causes the thread to block if the buffer of the blocking channel is empty.

11. The non-transitory computer readable storage medium of claim 9, wherein the blocking channel is introduced between the first thread and the second thread responsive to determining that the second operator performed by the second thread receives inputs from multiple threads.

12. The non-transitory computer readable storage medium of claim 9, wherein the blocking channel is introduced between the first thread and the second thread responsive to determining that the first operator performed by the first thread sends the output of the first operator to multiple threads.

13. The non-transitory computer readable storage medium of claim 9, wherein the blocking channel is introduced between the first thread and the second thread responsive to determining that at least one of the first thread or the second thread performs a non-linear operator, wherein a non-linear operator performs at least one of: receiving of data from a first plurality threads or sending data to a second plurality of threads.

14. The non-transitory computer readable storage medium of claim 9, wherein the blocking channel is introduced between the first thread and the second thread responsive to determining that the first operator performed by the first thread performs a broadcast of data to a plurality of threads.

15. The non-transitory computer readable storage medium of claim 9, wherein the blocking channel is introduced between the first thread and the second thread responsive to determining that the second operator performed by the second thread performs an aggregation of data stored in a table.

16. The non-transitory computer readable storage medium of claim 9, wherein the instructions for processing the database query further cause the one or more computer processors to perform steps comprising:
receiving, by the second thread, data stored in the buffer of the blocking channel for performing the second operator if there is data available in the buffer of the blocking channel, and
blocking execution of the second thread if the buffer of the blocking channel is empty, wherein execution of the second thread is blocked until the buffer of the blocking channel has data available for processing by the second operator.

17. A computer system comprising:
one or more computer processors; and
a non-transitory computer readable storage medium storing instructions that when executed by the one or more computer processors, cause the one or more computer processors to perform steps comprising:
receiving, by a database system, a database query for processing data stored in one or more input tables;
generating an execution plan for executing the database query, the execution plan comprising a plurality of operators, wherein at least an operator receives data output by another operator or generates output provided as input to another operator;

allocating a set of threads for executing operators of the execution plan, each thread processing one or more operators, the set of threads comprising at least a first thread executing a first operator and a second thread executing a second operator, wherein the first thread communicates with the second thread via a blocking channel, the blocking channel comprising a buffer of fixed capacity for storing data; and processing the database query by streaming data through the operators of the execution plan, wherein the first thread provides output of the first operator to the second operator of the second thread via the blocking channel, the processing comprising:

sending, by the first thread, data generated by the first operator to the second thread executing the second operator via the blocking channel if the buffer of the blocking channel has available capacity to store the data, and blocking execution of the first thread if the buffer of the blocking channel is full, wherein execution of the first thread is blocked until the buffer of the blocking channel has capacity to store the data generated by the first operator.

18. The computer system of claim 17, wherein the blocking channel allows a thread to perform one or more of:

a push operation that pushes data to the buffer of the blocking channel, wherein the push operation causes the thread to block if the buffer of the blocking channel is full; and a pull operation that pulls data from the buffer of the blocking channel, wherein the pull operation causes the thread to block if the buffer of the blocking channel is empty.

19. The computer system of claim 17, wherein the blocking channel is introduced between the first thread and the second thread responsive to determining that at least one of the first thread or the second thread performs a non-linear operator, wherein a non-linear operator performs at least one of: receiving of data from a first plurality threads or sending data to a second plurality of threads.

20. The computer system of claim 17, wherein the instructions for processing the database query further cause the one or more computer processors to perform steps comprising:

receiving, by the second thread, data stored in the buffer of the blocking channel for performing the second operator if there is data available in the buffer of the blocking channel, and blocking execution of the second thread if the buffer of the blocking channel is empty, wherein execution of the second thread is blocked until the buffer of the blocking channel has data available for processing by the second operator.

* * * * *